United States Patent [19]
Cunha

[11] 3,900,213
[45] Aug. 19, 1975

[54] ADJUSTABLE KING PIN

[75] Inventor: Joseph J. Cunha, Castro Valley, Calif.

[73] Assignee: Overhead Door Corporation, Dallas, Tex.

[22] Filed: Dec. 12, 1974

[21] Appl. No.: 531,983

[52] U.S. Cl. .............................. 280/407; 280/423 A
[51] Int. Cl.² ......................................... B62D 53/08
[58] Field of Search ............ 280/407, 423 A, 415 A

[56] References Cited
UNITED STATES PATENTS

| | | | |
|---|---|---|---|
| 2,495,943 | 1/1950 | Peterson | 280/407 UX |
| 2,714,016 | 7/1955 | Smith | 280/423 A X |
| 2,738,988 | 3/1956 | Claussen et al. | 280/432 |
| 2,923,560 | 2/1960 | Anderson | 280/407 |
| 3,198,548 | 8/1965 | Lund | 280/407 |

FOREIGN PATENTS OR APPLICATIONS

| | | | |
|---|---|---|---|
| 666,382 | 3/1965 | Belgium | 280/407 |
| 707,653 | 4/1965 | Canada | 280/423 A |

Primary Examiner—Leo Friaglia
Attorney, Agent, or Firm—Naylor, Neal & Uilkema

[57] ABSTRACT

A structure to provide for the longitudinal adjustment of a king pin relative to a vehicle chassis so that the distance between the king pin and the axle support for the chassis may be selectively varied. The structure comprises a mounting plate on the chassis with a pair of openings formed therein and a king pin supporting plate having a king pin depending downwardly therefrom for selective extension through either one or the other of the openings in the mounting plate. The king pin supporting plate is so proportioned as to cover the unused opening in the mounting plate and aligned openings are provided in the respective plates for the receipt of screw fasteners.

6 Claims, 5 Drawing Figures

ADJUSTABLE KING PIN

BACKGROUND OF THE INVENTION

The present invention relates to support structures for adjustably mounting a king pin on a wheel supported vehicle and, more particularly, is concerned with such a structure for use on a detachable third axle apparatus to provide for the selective adjustment of the distance between the axle of the apparatus and the king pin.

Adjustable king pins are well-known in the prior art and have been used on both detachable third axle apparatus and on semi-trailers. The adjustable king pins shown in U.S. Pat. Nos. 2,495,943 and 2,714,016 are representative of the type of adjustable mounting structure which has been used on detachable third axle apparatus. U.S. Pat. No. 2,889,154 shows an adjustable king pin mounting arrangement in use on a semi-trailer.

The prior art also suggests means to adjustable mount the running gear for a semi-trailer in order to selectively adjust the longitudinal distance between the trailer supporting axle and the king pin. U.S. Pat. No. 2,838,311 discloses such a means.

All of the prior art is typified by relatively complex adjusting means to provide for slidable adjustment of the king pin and/or axle. The complexity of the prior art means may be seen from the above-mentioned patents wherein special slidable mountings and cooperating detents are provided.

SUMMARY OF THE INVENTION

The present invention avoids the complexities and resultant shortcomings of the prior art by providing the chassis of the vehicle with which it is used with a generally horizontally disposed mounting plate and supporting the king pin on a generally horizontally disposed king pin plate adapted to be secured to the mounting plate in one or the other of at least two positions. The alternate positions are located at different longitudinally spaced distances from the support axle for the vehicle and fasteners are provided to selectively fix the mounting and king pin plates in juxtaposition relative to one another.

The principal object of the present invention is to provide an adjustable king pin of extremely simple construction which may be secured at select positions of adjustment without any possibility that it may become inadvertently displaced.

Another object of the invention is to provide an adjustable king pin which does not elevate the vehicle upon which it is used when the king pin is engaged with a fifth wheel.

Still another object of the invention is to provide an adjustable king pin with select positions to which it may be readily adjusted.

Yet another object of the invention is to provide an adjustable king pin which is secured against inadvertent displacement once it is fixed in an adjusted condition.

BRIEF DESCRIPTION OF THE DRAWINGS

The foregoing and other objects of the invention will become more apparent when viewed in light of the following detailed description and the accompanying drawings wherein.

DESCRIPTION OF THE ILLUSTRATED EMBODIMENT

Figure 1:
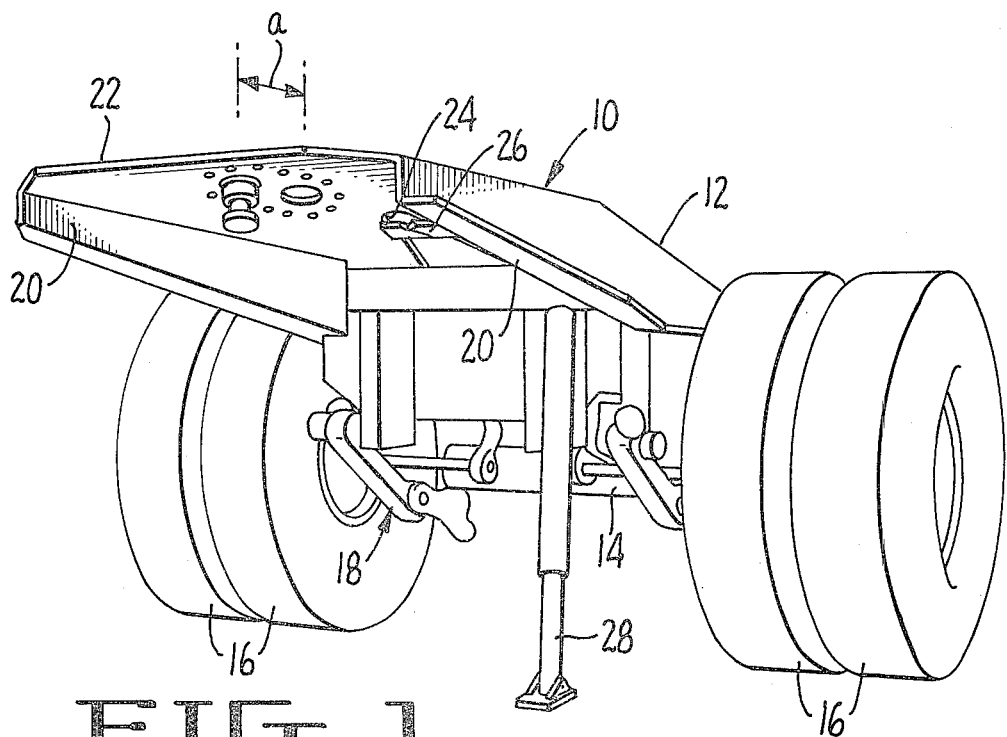
FIG. 1 is a perspective view of the underside of a detachable third axle apparatus wherein the adjustable king pin of the present invention is employed.

Referring now to FIG. 1, the detachable third axle apparatus is designed therein in its entirety by the numeral 10. The apparatus comprises a chassis 12 supported on a wheel supported axle 14. The wheels for the axle are designated by the numeral 16 and the trailing arm suspension structure for the axle is designated by the numeral 18. No detailed description of the suspension structure is necessary, as this may be of conventional construction.

The chassis of the third axle apparatus comprises longitudinally extending side support members 20 having a plate 22 fixed thereto and extending therebetween. The rearward end of the plate is provided with a slot 24 for receipt of the king pin of a trailing vehicle (e.g. a semi-trailer), which slot is provided with a locking show 26 for selective locking engagement with a king pin received within the slot.

Although forming no part of the present invention, the third axle apparatus shown in FIG. 1 also includes a ground support leg 28. This leg is provided to selectively support the dolly in the position illustrated in FIG. 1 when the dolly is detached from a semi-trailer tractor or the like lead vehicle. The leg is telescopically mounted so that it may be retracted when the dolly is engaged with a lead vehicle.

Figure 3:
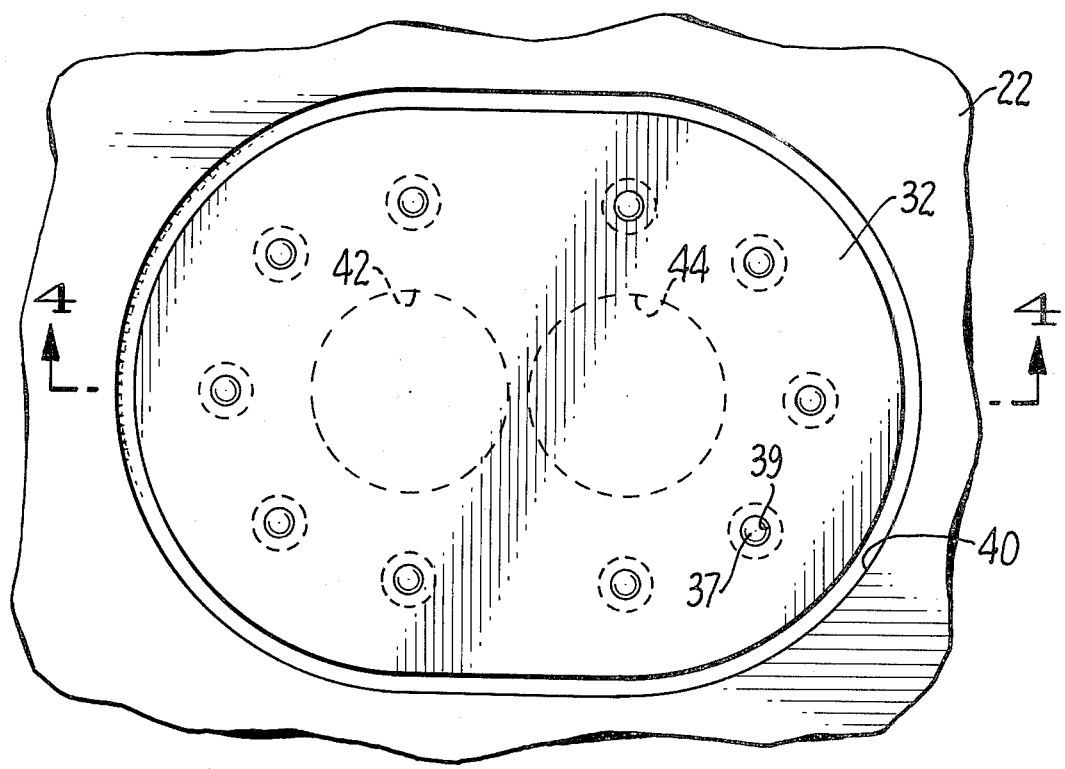
FIG. 3 is a fragmentary plan view of the detachable third axlwe apparatus of FIG. 1, showing the adjustable king pin of the present invention at the forward extremity of its adjustment.
Figure 4:
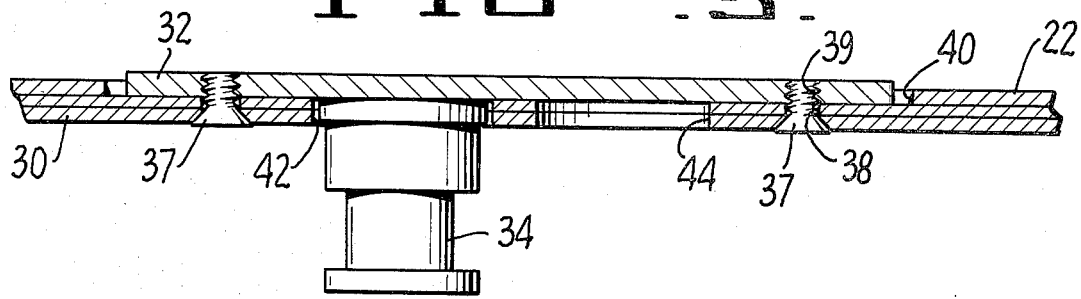
FIG. 4 is a sectional view taken on the plane designated by line 4—4 of FIG. 3.
Figure 5:
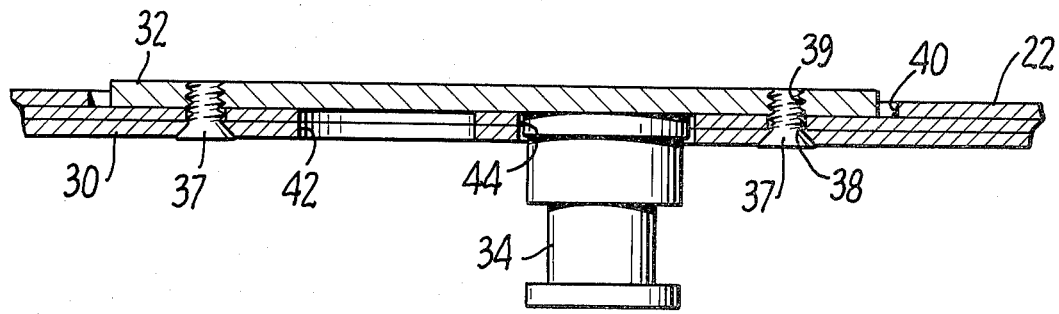
FIG. 5 is a sectional view similar to FIG. 4, showing the adjustable king pin of the present invention at the rearward extremity of its adjustment.

The adjustable king pin forming the subject of the present invention is disposed at the forward portion of the plate 22. In FIGS. 1, 3 and 4, the king pin is shown fixed in position at the forward extremity of its adjustment and in FIG. 2 the king pin is shown removed in a condition wherein it may be turned to either the forward or rearward extremity of its adjustment. FIG. 5 shows the king pin fixed at the rearward extremity of its adjustment.

Figure 2:
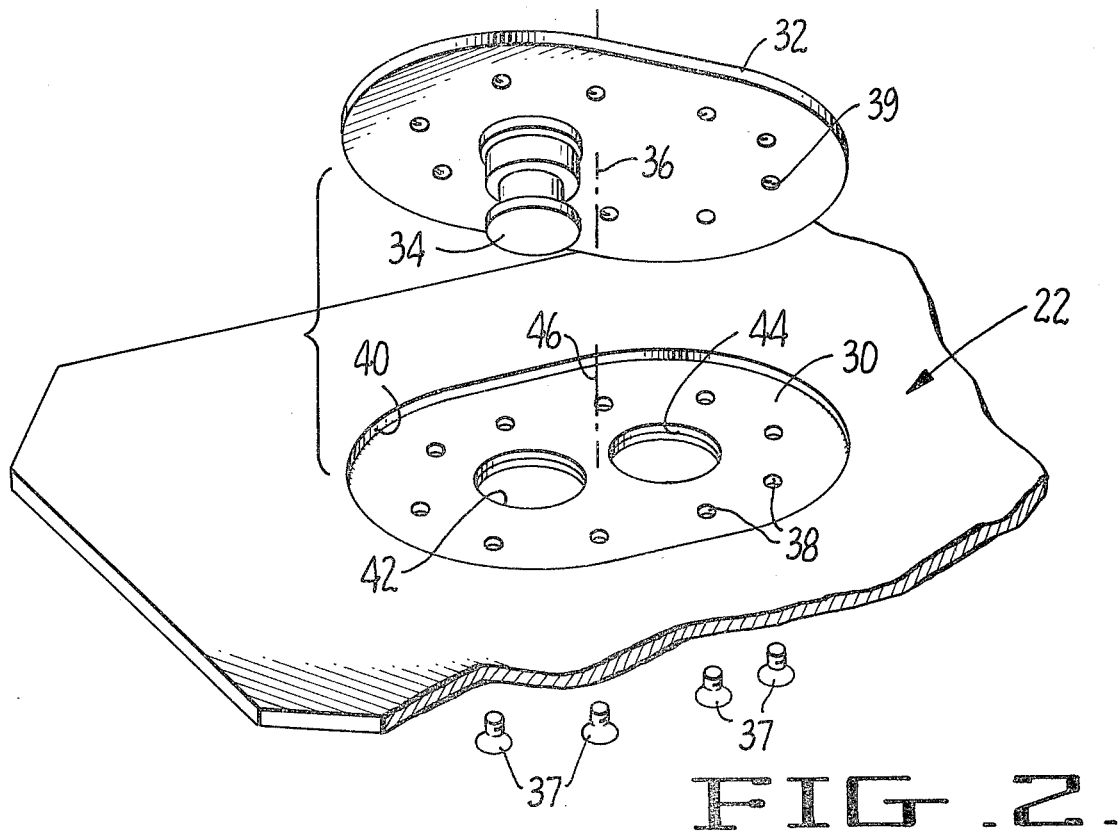
FIG. 2 is a fragmentary perspective view of the top side of the detachable third axle apparatus of FIG. 1, showing the mounting plate, king pin supporting plate and fasteners in exploded perspective for purposes of illustration.

The principal elements of the adjustable king pin, as may best be seen from FIG. 2, comprise: a generally horizontally disposed mounting plate 30 fixed to and forming part of the plate 22; a king pin supporting plate 32 having a king pin 34 fixed to and depending downwardly from the under surface thereof in eccentric relationship to the center line, designated 36, of the plate; and, a plurality of screw fasteners 37 extendible through aligned openings 38 and 39, respectively, in the mounting plate 30 and king pin supporting plate 32. The mounting plate 30 is recessed relative to the upper surface of the plate 22, as may be seen by the shoulder 40, in order that the king pin supporting plate 32 may assume a condition countersunk relative to the upper surface of the plate 22. Preferably, the thickness of the plate 32 is approximately equal to the depth of the shoulder 40 in order that the upper surface of the plate 32 may assume a position substantially flush with or extending only slightly above the upper surface of the plate 22 when the mounting plate and king pin supporting plate are fixedly secured in juxtaposition to one another. FIGS. 4 and 5 show the plates secured in juxtaposition and illustrate an embodiment where the thickness of the plate 32 is slightly greater than the depth of the shoulder 40. The boundary edge of the plate 32 is proportioned for receipt within the recess defined by the shoulder 40.

The mounting plate 30 is also provided with a pair of openings 42 and 44 positioned and proportioned for extension of the king pin 34 therethrough when the plate 32 is received within the recess defined by the shoulder 40. The openings 42 and 44 are eccentrically positioned relative to the center line, designated 46, of the mounting plate 30 by distances correspsonding to the distance by which the king pin 34 is spaced from the center line 36 of the king pin support plate 32. Thus, the plate 32 may be rotated about the axis 36 to position the king pin 34 in alignment with either one or the other of the openings 42 and 44. When the king pin is aligned with and received in one of the openings, the other of the openings is covered by the plate 32.

From the foregoing description, it will be apparent that the illustrated embodiment of the present invention provides for the adjustment of the king pin to one or the other of two positions. The distance between these positions is shown by the dimension line in FIG. 1 and designated by the letter $a$. It should be appreciated that this dimension may vary, depending on the degree of adjustment desired and that more than two positions of adjustment may be provided. Additional positions of adjustment may be provided by extending the length of the mounting plate 30 and providing additional king pin receiving openings therein.

In use, when it is determined that one of the positions of adjustment provided by the present invention is suitable, adjustment is made by simply aligning the king pin 34 with one or the other of the openings 42 or 44 and then lowering the king pin support plate 32 into juxtaposition with respect to the mounting plate 30. When the plate is fully lowered into position, the edges of the plate 32 will be confined within the boundaries defined by the shoulder 40. Once fully lowered into place, the screw fasteners 37 are extended through the openings 38 into threadable engagement with the openings 39. Once in engagement with the openings 39, the fasteners are tightened and, thus, the plate 32 is securely fastened to the plate 30 and the king pin is locked in place.

Should it be desired to readjust the position of the king pin after it has been locked into place, it is simply necessary to remove the fasteners 37, lift the plate 32 and turn the plate to the readjusted position. Once so readjusted, the plate 32 is again securely fastened in place through means of the fasteners 37.

From the foregoing description it is believed apparent that the present invention enables the attainment of the objects initially set forth herein. It should be understood, however, that the invention is not intended to be limited to the specifics of the illustrated embodiment, but rather is defined by the accompanying claims.

What is claimed is:

1. King pin attachment structure for use on a vehicle chassis suspended at least on end thereof on a wheel supported axle, said structure comprising: a generally horizontally disposed mounting plate on the chassis, said plate having at least two spaced openings formed therein so as to open to the exterior underside of the chassis, said openings being proportioned for the extension of a king pin therethrough; a king pin plate proportioned to overlie and cover both of the openings in the mounting plate, said king pin plate having a king pin fixed thereto and extending downwardly therefrom for select extension through one or the other of the openings; and securing means to selectively secure said king pin plate to the mounting plate whereby said plates may be secured in locked engagement with one another with the king pin extending through one or the other of the openings or released from such engagement to provide for rotation of said plate to position the king pin in one or the other of the openings.

2. King pin attachment structure according to claim 1 wherein the mounting plate is provided with an upwardly disposed recess extending aroung the openings therein, said recess being proportioned for receipt of the king pin plate so that the king pin plate assumes countersunk relationship with respect to the mounting plate when the plates are in locked engagement with one another.

3. King pin attachment structure according to claim 2 wherein the securing means comprises: a plurality of fastener openings formed in the respective plates for alignment with one another when the plates are in engagement; and fasteners engagable with said openings to secure the plates to one another.

4. King pin attachment structure for use on a vehicle chassis suspended at at least one end thereof on a wheel supported axle, said structure comprising: a generally horizontally disposed mounting plate on the chassis; a generally horizontally disposed king pin plate having a single king pin extending downwardly therefrom in eccentric relationship to the vertical axis thereof; and, securing means to selectively secure the king pin plate to the mounting plate in one or the other of at least two positions wherein the king pin extends downwardly from the mounting plate at different spaced locations from the wheel supported axle.

5. King pin attachment structure according to claim 4 wherein in one of the positions the king pin is disposed forwardly of the vertical axis of the king pin plate and in the other of the positions the king pin is disposed rearwardly of the vertical axis of the king pin plate.

6. King pin attachment structure according to claim 5 wherein the securing means comprises a plurality of fastener openings formed in the respective plates for alignment with one another when the king pin plate is in either one or the other of the two positions; and fasteners engagable with said openings to secure the plates to one another.

* * * * *